UNITED STATES PATENT OFFICE.

ARTHUR ASHWORTH, OF MANCHESTER, ENGLAND.

INDIGO SOLUTION.

SPECIFICATION forming part of Letters Patent No. 437,638, dated September 30, 1890.

Application filed October 1, 1889. Serial No. 325,693. (No specimens.)

*To all whom it may concern:*

Be it known that I, ARTHUR ASHWORTH, a subject of the Queen of Great Britain and a resident of Manchester, in the county of Lancaster, England, have invented new and useful Improvements in Indigo-Reducing Solutions, of which the following is a specification.

My invention relates to the preparation of indigo-vats for dyeing; and it consists in an improved solution of chemicals for reducing the indigo.

The ordinary system of reducing indigo for dyeing purposes is known to have many drawbacks, and Schutzenberger's hydrosulphite vat is expensive and also inconvenient, as on addition of lime to the hydrosulphite of zinc a large precipitate of zinc hydrate is formed, making the vat very muddy and rendering it impossible to recover the oxidized indigo from the vat. These drawbacks are obviated by preparing indigo-vats with my improved solution, which is made as follows: A solution of sodium bisulphite, containing about thirty-three pounds of $NaHSO_3$ in one hundred pounds of the solution, has added to it as much zinc-dust or iron or copper filings as it can dissolve. The liquor is separated from the zinc-dust or iron or copper filings remaining undissolved by filtration or decantation. To the filtrated or decanted liquor sodium sulphide ($Na_2S$) is added, when a precipitate is formed, and the addition of sodium sulphide is continued till the formation of precipitate ceases. The liquid is filtered and caustic soda added to it in varying quantity, accordingly as a rapid or slower reoxidation of the indigo or development of the color of the dyed material is desired, an increase of the quantity of soda prolonging the time of development. When to the solution thus prepared ground indigo is added, it is reduced immediately.

By preparing indigo-vats with a solution made as herein described the cost of reduction is decreased, and the vat being free from sediment the indigo reoxidized in the same can be re-reduced in the vat and the whole of it employed without any indigo being wasted. The size of the vessels used as vats can be reduced compared with those at present employed, the dyeing process is shortened, and the precipitate obtained in preparing the solution, consisting of the sulphide of the metal employed, forms a valuable by-product.

I claim—

1. A solution for reducing indigo for dyeing purposes, prepared by saturating a solution of sodium bisulphite with metal filings, separating the liquor, adding sodium sulphide to said liquor till the formation of precipitate ceases, filtering the liquor, and adding caustic soda to the same, substantially as herein described.

2. The reduction of indigo for dyeing purposes by means of a solution prepared by saturating a solution of sodium bisulphite with metal filings, separating the liquor, adding sodium sulphide to said liquor till the formation of precipitate ceases, filtering the liquor, and adding caustic soda to the same.

In testimony that I claim the foregoing as my invention I have signed my name, in presence of two witnesses, this 11th day of September, 1889.

ARTHUR ASHWORTH.

Witnesses:
W. R. DAVIES,
A. E. CHADWICK.